US 8,548,640 B2

(12) United States Patent
Belady et al.

(10) Patent No.: US 8,548,640 B2
(45) Date of Patent: Oct. 1, 2013

(54) HOME HEATING SERVER

(75) Inventors: Christian L. Belady, Mercer Island, WA (US); Sean James, Olympia, WA (US); Jie Liu, Madina, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 12/973,935

(22) Filed: Dec. 21, 2010

(65) Prior Publication Data
US 2012/0158190 A1 Jun. 21, 2012

(51) Int. Cl.
G05D 23/00 (2006.01)

(52) U.S. Cl.
USPC ........... 700/300; 700/295; 700/277; 700/282; 700/291

(58) Field of Classification Search
None
See application file for complete search history.

(56) References Cited

U.S. PATENT DOCUMENTS

| | | | | | |
|---|---|---|---|---|---|
| 3,681,578 | A | * | 8/1972 | Stevens | 714/11 |
| 4,358,823 | A | * | 11/1982 | McDonald et al. | 714/11 |
| 5,761,083 | A | * | 6/1998 | Brown et al. | 700/296 |
| 7,289,939 | B2 | * | 10/2007 | Cascaval et al. | 702/196 |
| 7,561,977 | B2 | | 7/2009 | Horst et al. | |
| 7,580,817 | B2 | * | 8/2009 | Bing | 703/6 |
| 7,783,390 | B2 | * | 8/2010 | Miller | 700/291 |
| 7,908,605 | B1 | * | 3/2011 | Graupner et al. | 718/104 |
| 8,121,734 | B2 | * | 2/2012 | Larsen et al. | 700/276 |
| 8,301,315 | B2 | * | 10/2012 | Dawson et al. | 700/300 |
| 8,335,859 | B2 | * | 12/2012 | Nagpal et al. | 709/238 |
| 2003/0110248 | A1 | * | 6/2003 | Ritche | 709/224 |
| 2003/0193777 | A1 | * | 10/2003 | Friedrich et al. | 361/687 |
| 2007/0271475 | A1 | * | 11/2007 | Hatasaki et al. | 713/324 |
| 2008/0065919 | A1 | * | 3/2008 | Hatasaki et al. | 713/324 |
| 2008/0301479 | A1 | * | 12/2008 | Wood | 713/322 |
| 2009/0106571 | A1 | * | 4/2009 | Low et al. | 713/310 |
| 2009/0150700 | A1 | * | 6/2009 | Dell'Era | 713/324 |
| 2009/0228726 | A1 | * | 9/2009 | Malik et al. | 713/320 |
| 2009/0240964 | A1 | * | 9/2009 | Pfeiffer | 713/320 |
| 2009/0300607 | A1 | * | 12/2009 | Ferris et al. | 718/1 |
| 2010/0057641 | A1 | * | 3/2010 | Boss et al. | 705/412 |
| 2010/0223385 | A1 | * | 9/2010 | Gulley et al. | 709/226 |
| 2010/0318851 | A1 | * | 12/2010 | Learmonth | 714/37 |
| 2010/0333105 | A1 | * | 12/2010 | Horvitz et al. | 718/105 |
| 2012/0065788 | A1 | * | 3/2012 | Harper et al. | 700/291 |
| 2012/0130554 | A1 | * | 5/2012 | Jain et al. | 700/291 |

OTHER PUBLICATIONS

Vela, Justin, "Helsinki data centre to heat homes", Retrieved at << http://www.guardian.co.uk/environment/2010/jul/20/helsinki-data-centre-heat-homes >>, Jul. 20, 2010, pp. 6.

(Continued)

Primary Examiner — Kavita Padmanabhan
Assistant Examiner — Christopher E Everett
(74) Attorney, Agent, or Firm — Michael B Dodd; Dodd Law Group

(57) ABSTRACT

A server computer may be located at a home or business and may be used for heating the home or business. The server computer may operate a distributed cloud based application and may generate heat in response to application load. The server computer may have an air or water based heat exchanger that may integrate into various heating, ventilation, and air conditioning systems to use the heat generated by the server. In some embodiments, a thermostat may regulate the application load on the server computer as controlled by a cloud based controller.

18 Claims, 3 Drawing Sheets

(56) References Cited

OTHER PUBLICATIONS

Miller, Rich, "Data centers heat offices, greenhouses, pools", Retrieved at << http://www.datacenterknowledge.com/archives/2010/02/03/data-centers-heat-offices-greenhouses-pools/ >>, Feb. 3, 2010, pp. 8.

Trowbridge, Dave, "Using waste heat from the data center", Retrieved at << http://newsroom.cisco.com/dlls/2010/hd_010410.html >>, Jan. 4, 2010, p. 1.

Heimbuch, Jaymi, "Data center housed under cathedral heats homes in Finland", Retrieved at << http://www.treehugger.com/files/2009/12/data-center-housed-under-catherdral-heats-homes-in-finland.php >>,Dec. 1, 2009, pp. 2.

Tousi, Saleh, "Heat rises—re-using the heat generated by servers",Retrieved at << http://ezinearticles.com/?Heat-Rises---Re-Using-the-Heat-Generated-by-Servers&id=2372629 >>, May 20, 2009, pp. 6.

Heger, Monca, "IBM tests heating homes with data-center waste heat", Retrieved at << http://spectrum.ieee.org/computing/hardware/ibm-tests-heating-homes-with-datacenter-waste-heat >>, Nov. 20, 2008, p. 1.

Fontecchio, Mark, "Companies reuse data center waste heat to improve energy efficiency", Retrieved at << http://searchdatacenter.techtarget.com/news/1314324/Companies-reuse-data-center-waste-heat-to-improve-energy-efficiency >>, May 20, 2008, pp. 5.

\* cited by examiner

HOME HEATING SERVER

BACKGROUND

Energy consumption in datacenters is an ever growing issue. Datacenters often house many thousands of computers and generate a very large amount of heat, most of which may be managed through large cooling systems. Thus, a datacenter often uses electricity to generate heat, and then uses even more electricity to dissipate the same heat.

SUMMARY

A server computer may be located at a home or business and may be used for heating the home or business. The server computer may operate a distributed cloud based application and may generate heat in response to application load. The server computer may have an air or water based heat exchanger that may integrate into various heating, ventilation, and air conditioning systems to use the heat generated by the server. In some embodiments, a thermostat may regulate the application load on the server computer as controlled by a cloud based controller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
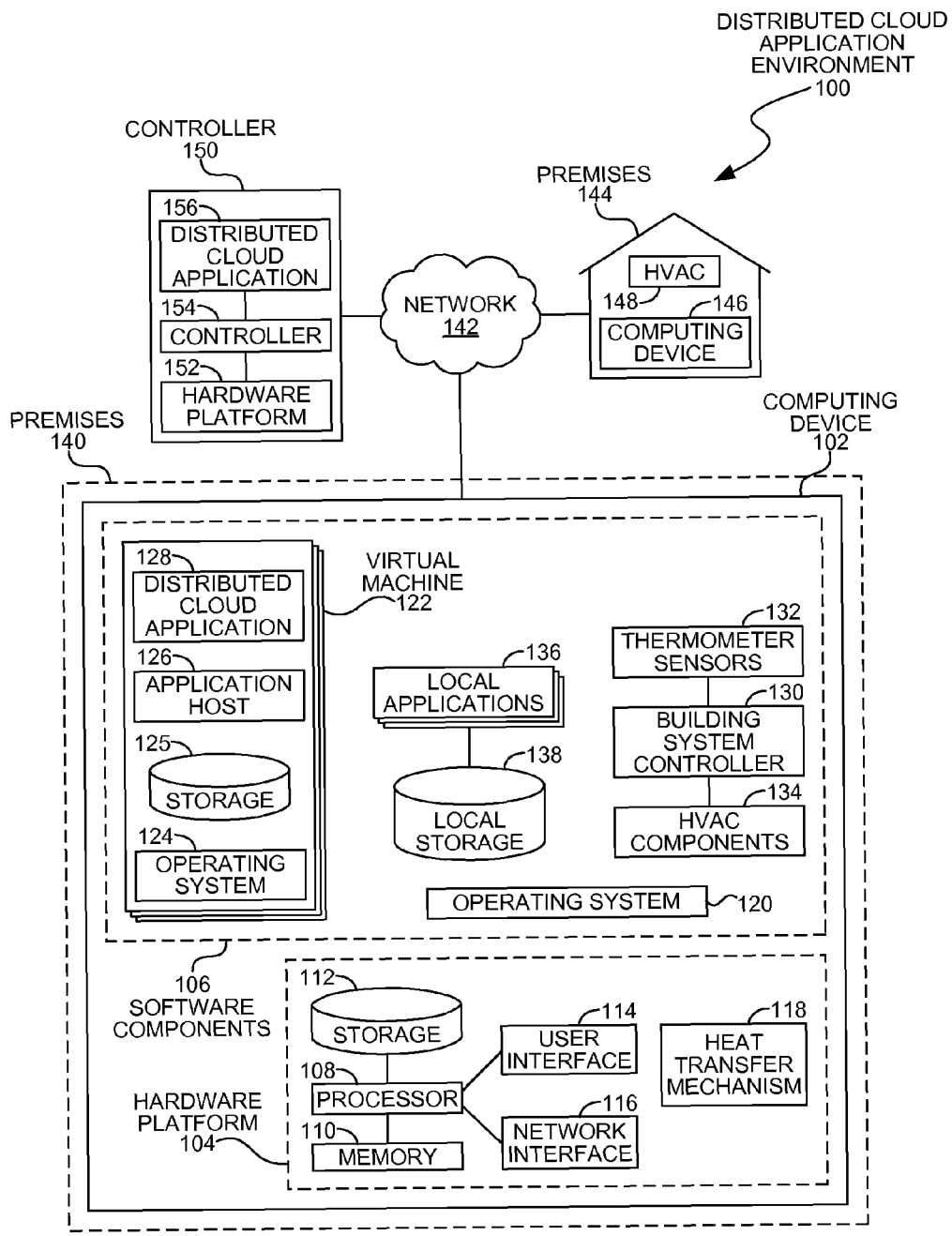
FIG. 1 is a diagram illustration of an embodiment showing a system for operating a distributed cloud application.

A home or business may have a server computer with a heat exchanger configured to provide heat to a structure. The server computer may execute a distributed cloud application and may be controlled in part to generate heat through demand on the distributed cloud application. In one embodiment, a thermostat in the home or residence may be used by a cloud application controller to increase or decrease computational demand on the server computer to produce more or less heat.

The server computer may execute a distributed application and may be controlled by a cloud based controller. The distributed application may be any type of large scale application that may or may not be regulated to control demand on the application.

The server computer may have a heat exchange mechanism and associated connections into a building's heating, ventilation, and air conditioning (HVAC) system. In some embodiments, the heat exchange may use air or liquid as a heat transfer medium. An embodiment with air heat exchange may use ducting and various valves to control heat exchange and to route the heat into the building.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and maybe accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing an environment for operating a distributed cloud application and providing heating into homes or residences. Embodiment 100 is a simplified example of a computer environment that may have server computers integrated into a heating, ventilation, and air conditioning system for a building.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates an example of a heating system that may incorporate a computer, where the computer may act as a furnace to generate heat for use in a building. The computer may execute a distributed cloud application and may be controlled from a cloud application controller to increase or decrease the heat generated. The cloud application controller may increase or decrease the computing payload of the computer in response to a thermostat or other temperature measurement system within the building.

The distributed cloud application may be an application that may be distributed to many different computers, each of which may perform a small portion of the overall workload. In one example, a distributed cloud application may be a search engine, where each computer may be capable of searching a small portion of a database that may be locally or remotely accessible. In another example, a distributed cloud application may be a massively parallel processing application, such as a finite element analysis or computational fluid dynamics application, where each computer may perform a small portion of the analysis. Some distributed cloud applications may use message passing interfaces or other schemes for communicating with other nodes within the application.

Embodiment 100 illustrates a computing device 102 that may be located within a premise 140. The device 102 is illustrated having hardware components 104 and software components 106. The device 102 as illustrated represents a conventional computing device, although other embodiments may have different configurations, architectures, or components.

In many embodiments, the device 102 may be a server computer that may be designed with a heat transfer mechanism 118 that may transfer heat generated by the device 102 to a heating ventilation and air conditioning system for the premise.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be a memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors. In some embodiments, a device 102 may not have hardware user interface, but may be accessible from another device over a network.

The network interface 116 may be any type of connection to another computer. In many embodiments, the network interface 116 may be a wired Ethernet connection. Other embodiments may include wired or wireless connections over various communication protocols.

The heat transfer mechanism 118 may be a device to transfer heat from the hardware platform 104 to a heating ventilation and air conditioning system. The heat transfer mechanism 118 may use various types of thermal media, such as air or liquid coolant, and may incorporate one or more heat exchangers.

In some embodiments, the heat transfer mechanism 118 may integrate into the ductwork of a forced air ventilation system. In other embodiments, the heat transfer mechanism 118 may integrate into a radiant floor heating system, baseboard heating system, or any other type of heating system. In some embodiments, the heat transfer mechanism 118 may integrate into a domestic hot water system and may preheat or heat domestic hot water.

In some embodiments, a single premise may have many computing devices each with a heat transfer mechanism to generate enough heat for a building. In some cases, two, three, four, or even ten or one hundred or more devices may be used to heat a single facility.

The software components 106 may include an operating system 120 on which various applications and services may operate. An operating system may provide an abstraction layer between executing routines and the hardware components 104, and may include various routines and functions that communicate directly with various hardware components.

The software components 106 may include one or more virtual machines 122 on which a guest operating system 124, application host 126, and distributed cloud application 128 may execute. A virtual machine 122 may be a software simulation of hardware components and may isolate the guest operating system 124 and associated applications from other virtual machines and other processes that may be executing on the hardware platform 104.

The virtual machines 122 may allow a cloud application administrator to manage a cloud application by downloading the entire virtual machine 122 to the device 102 from a network location, or by copying or moving the virtual machine 122 to another device within the same premise or another premise.

Some embodiments may not use a virtual machine 122 and may have the distributed cloud application 128 operating on a host operating system.

The application host 126 may be an administrative application, service, or process through which the virtual machine 122 and the distributed cloud application 128 may be managed. The application host 126 may allow a remote administrator to configure and control the virtual machine 122 and the distributed cloud application 128, among other functions.

The distributed cloud application 128 may be an application that may be designed for operating in the environment of embodiment 100. In a conventional residence or business, the power reliability may not be high, and the computer hardware may or may not be as reliable as servers found in a datacenter, for example. As such, the computational reliability of the device 102 may not be very high and the distributed cloud application 128 may be distributed onto duplicate or redundant premises.

In some embodiments, the distributed cloud application 128 may be a portion of a much larger application. The distributed cloud application 128 may have a subset of the entire executable code for the application and may not be able to perform all of the functions of the application. In some embodiments, the distributed cloud application 128 may have the full executable code, but may only process a subset of the data for the overall application.

The virtual machine 122 may have some storage 125 which may contain data accessed by the distributed cloud application 128. In one example, the distributed cloud application 128 may be a distributed database application and may process queries against a portion of a larger database, where the portion may be stored in the storage 125.

The device 102 may include a building system controller 130 that may have various inputs, including thermostat or thermometer sensors 132. The building system controller 130 may also be able to control various heating ventilation and air conditioning components 134. In some embodiments, the building system controller 130 may be a whole building controller that may control lighting, refrigeration, audio/video, and other systems within a building.

In some embodiments, the computing device 102 may provide computing services for access within a premise or local area network. In such embodiments, a set of local applications 136 and local storage 138 may be accessed by users within the premise 140.

The computing device 102 may be connected to a network 142, which may be the Internet, a wide area network, or some other network. In a typical embodiment, many different premises 144 may have a computing device 146 that may be integrated into the home heating system 148.

A controller 150 may be a remote device that may manage, monitor, and control the distributed cloud applications in the various premises. In some embodiments, a single distributed cloud application may be executed on many thousands or even hundreds of thousands of computing devices.

The controller 150 may have a hardware platform 152 on which a controller application 154 may execute. The controller application 154 may transmit some or all of a distributed cloud application 156 to the various premises and cause the distributed cloud application 156 to execute.

Figure 2:
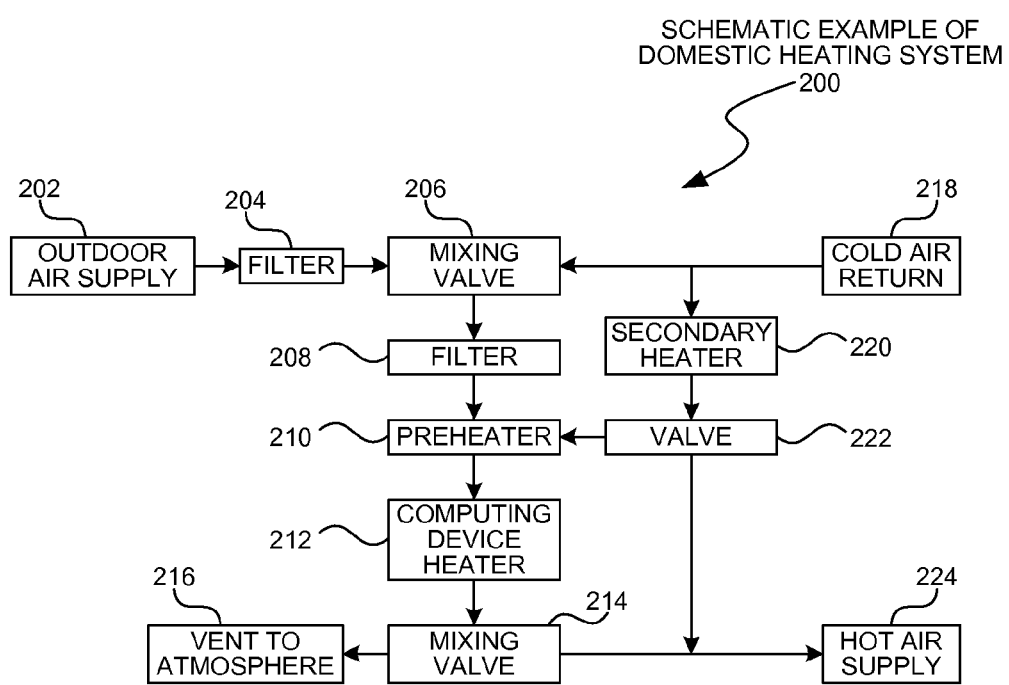
FIG. 2 is a diagram illustration of an example embodiment showing a domestic heating system with a computer heat source.

FIG. 2 is a diagram illustration of an embodiment 200 showing a schematic illustration of a domestic heating system that may use a computing device as a heat source.

Embodiment 200 is a simplified example of a forced air heating system for a building. Other embodiments may have different configurations, different components, and different characteristics. Embodiment 200 is presented merely as one example of a heating system that may incorporate a computing device as a heating element.

An outdoor air supply 202 may supply air to the building. The outdoor air may pass through a filter 204 and into a mixing valve 206. The mixing valve 206 may be a variable valve that may mix the outdoor air supply 202 with air from a cold air return 218.

After the mixing valve 206, air may pass through another filter 208 and a preheater 210, then pass through a computing device heater 212. In a simple embodiment, the computing device heater 212 may have ductwork that may pass cold air over the computing devices. In such an embodiment, a preheater 210 may be used to preheat air so that the computing devices are not shock-cooled and are operated within their normal operating temperatures.

In another example, the computing devices may have a liquid cooling system that may extract heat from one or more components in the computing device and the heated liquid may be passed through a heat exchanger, which may be represented by the computing device heater 212. In such an embodiment, the computing devices may be located outside the building's heating airflow path.

After passing through the computing device heater 212, the air may pass through another mixing valve 214 which may be configurable to direct the heated air to a vent to atmosphere 216 or to the hot air supply 224 for the building.

Some embodiments may have a secondary heater 220 and a valve 222 which may be used to feed the preheater 210 or to operate as a secondary or auxiliary heat source for the premise. The secondary heater 220 may be a solar heat, propane, natural gas, fuel oil, electric, or some other type of heating source.

Figure 3:
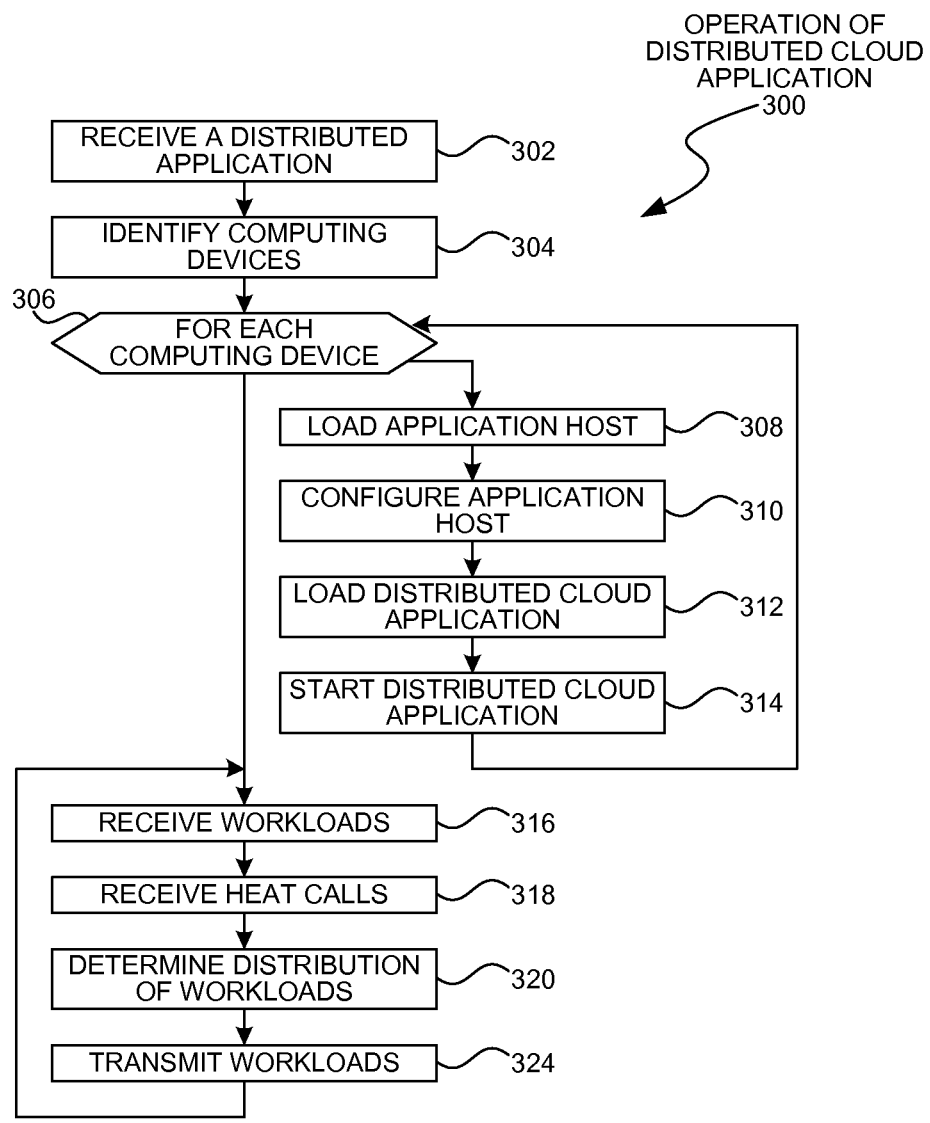
FIG. 3 is a flowchart illustration of an embodiment showing a method for deploying and operating a distributed cloud application.

FIG. 3 is a flowchart illustration of an embodiment 300 showing a method for operating a distributed cloud application. The process of embodiment 300 may be performed by a distributed application controller and may manage and operate distributed cloud applications at various premises.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a simplified example of a method for managing a distributed cloud application.

In block 302, a distributed cloud application may be received. The computing devices that may execute the distributed cloud application may be identified in block 304.

For each computing device in block 306, the application host may be loaded in block 308 onto the computing device and may be configured in block 310. In block 312, the distributed cloud application may be loaded onto the computing device and may begin operation in block 314.

In some embodiments, the application host may cause the distributed cloud application to be downloaded to the computing device and begin operation in blocks 312 and 314.

After configuring all of the computing devices in block 306, the application may begin operation.

In block 316, workloads for the computing devices may be received. In block 318, heating calls may be received from the premises. The heating calls may indicate a heat demand on the computing device. When more heat is demanded at the premises, a higher number of workloads may be passed to the computing devices on the premises. The higher the workload, the more heat may be generated by the computing device and thereby the heat of the premise may be regulated.

The distribution of the workloads may be determined in block 320 and the workloads may be transmitted to the computing devices on the premises in block 324. The process may return to block 316 to process additional workloads.

The operations of embodiment 300 from blocks 316 through 324 may operate as a load balancing system for transferring incoming workloads to the various computing devices. As part of the load balancing criteria, the heat demands of a building may be considered. Computing devices within buildings with high heat demand may be assigned more workload than computing devices within other buildings with little or no heat demand.

In some cases, computing devices in buildings with little or no heat demands may still be assigned workloads, but the building's heating system may be configured to vent any excess heat to atmosphere.

In many embodiments, a cloud application controller may manage the various computers executing the distributed cloud application by detecting failures of an instance of the application. In one example, the controller may assign two or more separate computers the same workload. The results from the different computers may be compared to determine if the results are the same. If the results are not the same, the controller may determine which result is correct and may identify one or more faulty computers. If the results are the same, the results may be assumed to be correct, and the results may be passed to a requestor.

The cloud application controller may detect failures and cause some corrective action to be taken. In some cases, the controller may dispatch a maintenance technician to make a visit to the premises where a faulty computer may be. In some cases, the controller may determine which parts of the computer may be replaced and send those parts to the premises for a user to replace. In some cases, the controller may contact the local user and request that the local user perform some diagnosis or maintenance. For example, the controller may transmit an email to a local user instructing the user to perform a hard power cycle of the computer.

In many embodiments, the distributed cloud application may be specifically designed for distributed applications. Some such applications may be delay tolerant, where the response time of the computers may be much longer than conventional datacenter computers. In many cases, multiple copies of the application and workloads may be distributed across multiple computers on multiple premises.

Examples of various distributed cloud applications may be scientific computing applications, offline data analysis and data mining applications, business intelligence gathering applications, index building for search systems, backup applications, graphics and video rendering, verification and synthesis for complex designs such as circuit analysis, or for many other applications.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a controller, the controller communicatively coupled to one or more computer systems at each of a plurality of different premises, each of the one or more computer systems at each premise configured to execute assigned workloads to generate heat for satisfying a heat demand at said premise, each of the one more other computer systems at each premise having a heat transfer mechanism that transfers heat from said computer system to a building heat system on said premise, each workload including at least a portion of a distributed application, the controller configured to:
receive an indication of a heat demand at each premise from among said plurality of different premises, said heat demand being a heat request for a building heating system on said premise, said heat demand not based on cooling costs at said premise; and
load balance a plurality of workloads across said plurality of different premises considering said indicated heat demand at said each premise as a load balancing criteria, including:
for each of the plurality of premises, adjust a number of workloads assigned to said one or more computer systems at said premise based on said indicated heat demand at said premise, said number of workloads adjusted to cause components of said one or more computer systems to generate heat to satisfy said indicated heat demand at said premise and heat said premise.

2. The system of claim 1, said building heating system having at least one regulating valve.

3. The system of claim 2, said building heating system having a heat vent configuration that removes heat from said computing device and exhausts at least a portion of said heat to atmosphere.

4. The system of claim 1, said heat demand at at least one premise being determined by a thermostat located within said premise.

5. The system of claim 4, said controller receiving output from said thermostat.

6. The system of claim 1, said heat transfer mechanism using a liquid as a heat transfer medium.

7. The system of claim 1, said building heating system having a secondary heat source.

8. The system of claim 1, said building heating system having at least one filter.

9. The system of claim 1, wherein a first premise indicates a first heat demand and a second premise indicates a second different heat demand, said first heat demand demanding more heat than said second heat demand, and wherein for each of the plurality of premises, assign a number of workloads to the one or more computer systems at said premise based on said indicated heat demand at said premise comprises:
assign a first number of workloads to said one or more computer systems at said first premise; and
assign a second number of workloads to said one or more computer systems at said second premise, said second number of workloads configured to generate less heat than said first number of workloads.

10. At a computer system, the computer system communicatively coupled to one or more computer systems at each of a plurality of different premises, each of the one or more computer systems at each premise configured to execute assigned workloads to generate heat for satisfying a heat demand at said premise, each of the one more other computer systems at each premise having a heat transfer mechanism that transfers heat from said computer system to a building heat system on said premise, each workload including at least a portion of a distributed application, a method for allocating execution of one or more distributed applications, the method comprising:
receiving an indication of a heat demand at each premise from among the plurality of different premises, said heat demand being a heat request for a building heating system on said premise, said heat demand not based on cooling costs at said premise; and load balancing a plurality of workloads across said plurality of different premises considering said indicated heat demand at said each premise as a load balancing criteria, including:

for each of the plurality of premises, adjusting a number of workloads assigned to said one or more computer systems at said premise based on said indicated heat demand at said premise, said number of workloads adjusted to cause components of said one or more computer systems to generate heat to satisfy said indicated heat demand at said premise and heat said premise.

11. The method of claim 10 further comprising:

detecting a fault with a first computing device at a first premise; and notifying a user at said first premise.

12. The method of claim 10, said one or more distributed applications including a delay tolerant application.

13. The method of claim 10, wherein load balancing a plurality of workloads across said plurality of different premises includes assigning an identical workload to the one or more computer systems at a first premise and a second different premise, the first premise and the second different premise selected from among the plurality of premises.

14. The method of claim 13 further comprising:

receiving a first response from said first premise and receiving a second response from said second premise; and comparing said first response to said second response to determine that said first response is equivalent to said second response and accepting said first response as a valid response.

15. A system comprising:

a premise having one or more computer systems configured to execute assigned workloads to generate heat for satisfying heat demands at said premise, said assigned workloads distributed from a controller, said one or more computer systems communicatively coupled to the controller, said controller configured to load balance assigned workloads across said premise and one or more other premises by adjusting said assigned workloads based on indicated heat demands at said premise and said one or more other premises, said premise including:

sensor components configured to indicate a heat demand at said premise to said controller, said heat demand being a heat request for a building's forced air heating system at said premise, said heat demand not based on cooling costs at said premise; and a computer system having a heat transfer mechanism incorporated into said building's forced air heating system that transfers heat from said computer system to said building's forced heating system on said premise, said computer system configured to:

execute workloads assigned to said computer system to cause hardware components of the computer system to generate heat for satisfying the indicated heat demand and heat said premise.

16. The system of claim 15 further comprising a second premise having one or more computer systems configured to execute workloads distributed from said controller, said second premise included in said one or more other premises, said second premise including:

second sensor components configured to indicate a second different heat demand at said second premise to said controller, said second heat demand being a heat request for building heating system at said second premise, said heat demand not based on cooling costs at said second premise; and a second computer system having a heat transfer mechanism incorporated into a second building's forced air heating system that transfers heat from said second computer system to said second building heating system on said second premise, said computer system configured to:

execute second workloads assigned to the computer system to cause hardware components of the computer system to generate heat for satisfying the indicated second different heat demand and heat said second premise.

17. The system of claim 16, wherein the indicated heat demand demands more heat than the second indicated heat demand and wherein the workloads assigned to the computer system are configured to generate more heat than the second workloads assigned to the second computer system.

18. The method of claim 10, wherein a first premise indicates a first heat demand and a second premise indicates a second different heat demand, said first heat demand demanding more heat than said second heat demand, and wherein for each of the plurality of premises, adjusting a number of workloads assigned to the one or more computer systems at said premise based on said indicated heat demand at said premise comprises:

assigning a first number of workloads to said one or more computer systems at said first premise; and assigning a second number of workloads to said one or more computer systems at said second premise, said second number of workloads configured to generate less heat than said first number of workloads.

\* \* \* \* \*